(12) United States Patent
Murase

(10) Patent No.: US 6,272,111 B1
(45) Date of Patent: *Aug. 7, 2001

(54) ROUTING SYSTEM

(75) Inventor: Tutomu Murase, Tokyo (JP)

(73) Assignee: NEC Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/792,380

(22) Filed: Feb. 3, 1997

(30) Foreign Application Priority Data

Feb. 2, 1996 (JP) .................................................. 8-017821

(51) Int. Cl.[7] .................................................. H04L 12/28
(52) U.S. Cl. .......................... 370/237; 370/397; 370/409
(58) Field of Search ..................................... 370/355, 356, 370/229, 238, 397, 398, 351, 395, 228, 230, 237, 349, 409; 455/445

(56) References Cited

U.S. PATENT DOCUMENTS

| 5,513,178 | * | 4/1996 | Tanaka | 370/58.2 |
| 5,715,237 | * | 2/1998 | Akiyoshi | 370/228 |
| 5,963,863 | * | 10/1999 | Berggren | 455/445 |

FOREIGN PATENT DOCUMENTS

| 0645918A | 3/1995 | (EP) . |
| 0538853A | 4/1995 | (EP) . |
| 0683619A | 11/1995 | (EP) . |
| 1-101756 | 4/1989 | (JP) . |
| 6-38257 | 2/1994 | (JP) . |
| 6-205077 | 7/1994 | (JP) . |
| 7-131456 | 5/1995 | (JP) . |

OTHER PUBLICATIONS

H. Suzuki et al., "Fast Bandwidth Reservation Scheme with Multi–Link & Multi–Path Routing in ATM Networks", *IEEE Communications Society, Reprint,* Dec. 2–5, 1991, pp. 2233–2240.
Sallberg K. et al. "ATM Traffic Management at the Initial Depolyment of B–ISDN" *Ericsson Review, SE, Ericsson. Stockholm,* vol. 71, No. 4, 1994, pp. 150–159.

* cited by examiner

*Primary Examiner*—Chau Nguyen
*Assistant Examiner*—Alexander O. Boakye
(74) *Attorney, Agent, or Firm*—Sughrue, Mion, Zinn, Macpeak & Seas, PLLC

(57) ABSTRACT

The prior art suffered from problems such as communication quality degradation including reductions in network throughput, delays, and cell loss. An additional problem was the consumption of large amounts of the VCI and VPI required at links between nodes of each connection due to the use of a plurality of connections. In response to these problems, according to the routing system of the present invention, the plurality of connections are not changed for sections in which the routes to be taken are different but are consolidated into one connection for sections in which the routes to be taken are the same; and a connecting device provided at the node, which are set up for a plurality of connections to either or to both the input and output sides, discretionary makes either a first connection, which is either the plurality of connections or one consolidated connection, to the input side, or a second connection, which is either the plurality of connections or one consolidated connection, to the output side.

12 Claims, 7 Drawing Sheets

FIG. 1
Prior Art

| input-side VCI/VPI | output-side VCI/VPI |
|---|---|
| VC100 | VC200 |
| VC101 | VC202 |
| VC102 | VC204 |

FIG. 3

| input-side VCI/VPI | output-side VCI/VPI |
|---|---|
| VC100 | VC200 |
| VC101 | VC200 |
| VC102 | VC200 |
| VC103 | VC201 |
| VC104 | VC201 |
| VC105 | VC201 |

FIG. 5

| AI | input-side VCI/VPI | output-side VCI/VPI |
|---|---|---|
| 1 | VC100 | VC200 |
| 0 | VC100 | VC201 |
| 0 | VC100 | VC202 |
| 0 | VC101 | VC203 |
| 1 | VC101 | VC204 |
| 0 | VC101 | VC205 |

FIG. 6

| AI | input-side VCI/VPI | output-side VCI/VPI |
|---|---|---|
| 0 | VC100 | VC200 |
| 1 | VC100 | VC201 |
| 0 | VC100 | VC202 |
| 1 | VC101 | VC200 |
| 0 | VC101 | VC201 |
| 0 | VC101 | VC202 |

FIG.5A

| DICTIONARY NAME | ACCOUNT DATE TABLE | |
|---|---|---|
| EVALUATION NAME | CONDITION | COLOR |
| ACCOUNT DATE | 20TH DAY | BLUE |
| | THE END OF MONTH | RED |

FIG.5B

| DICTIONARY NAME | CLIENT TABLE | |
|---|---|---|
| EVALUATION NAME | CONDITION | COLOR |
| CLIENT NAME | ABC Co., Ltd. | BLUE |
| | XYZ Co., Ltd. | RED |

FIG.5C

| DICTIONARY NAME | ISSUE DATE TABLE | |
|---|---|---|
| EVALUATION NAME | CONDITION | COLOR |
| ISSUE YEAR | 1994 | GREEN |
| | 1995 | RED |
| | 1996 | BLUE |
| | 1997 | YELLOW |
| | ⋮ | ⋮ |
| ISSUE MONTH | JANUARY | RED (HALFTONE 1) |
| | FEBRUARY | RED (HALFTONE 2) |
| | ⋮ | ⋮ |
| | NOVEMBER | BLUE (HALFTONE 5) |
| | DECEMBER | BLUE (HALFTONE 6) |

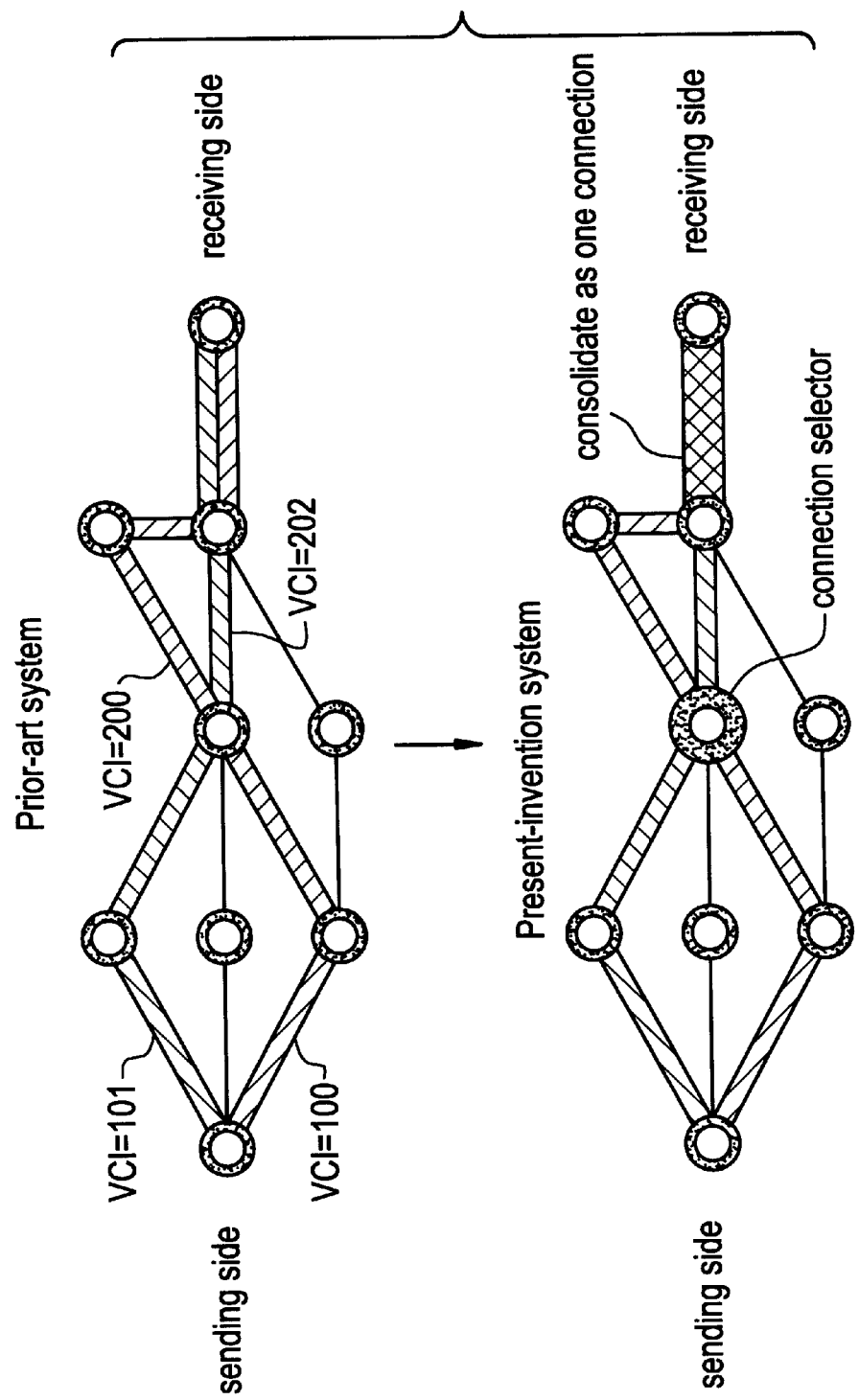

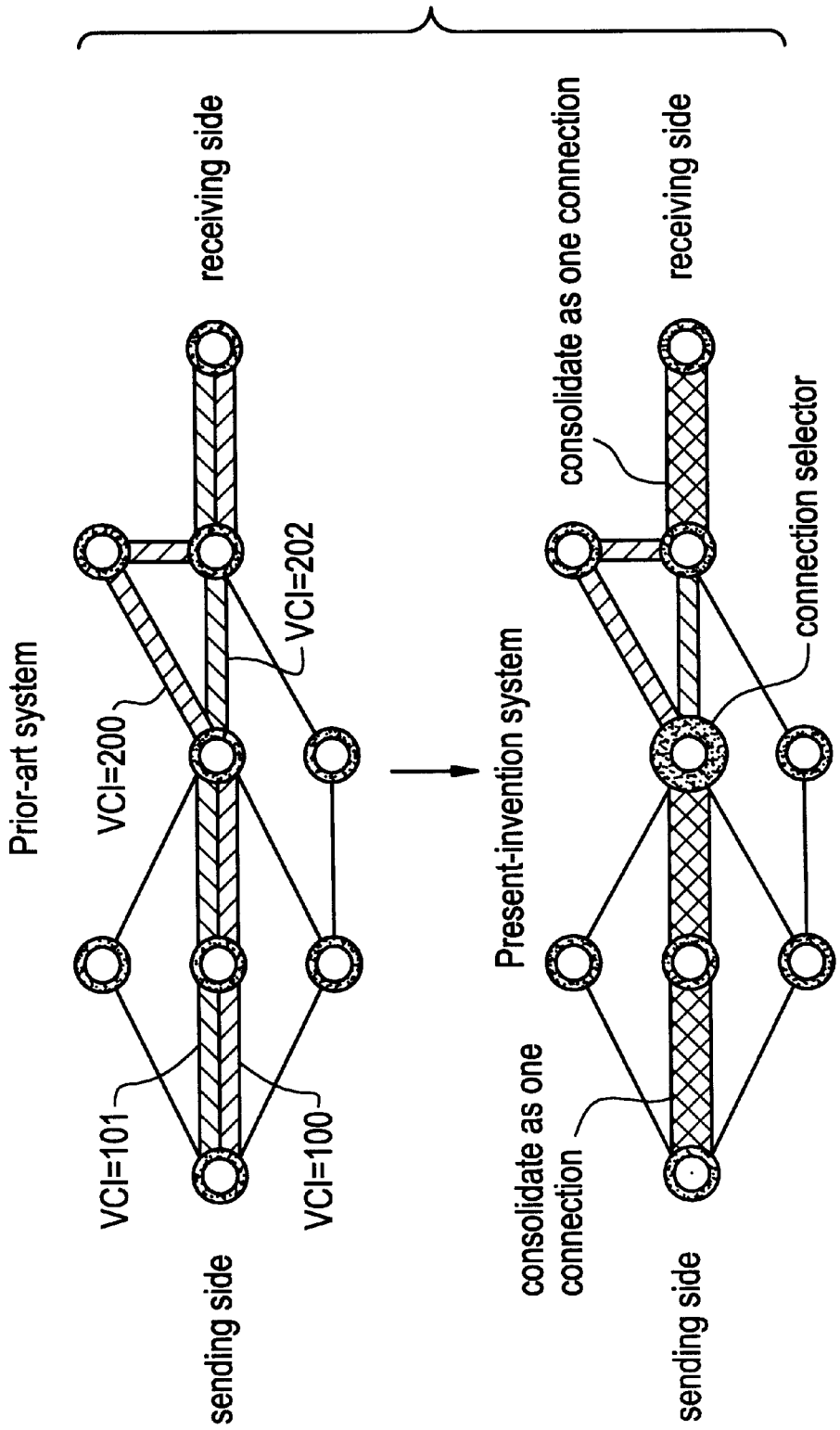

ROUTING SYSTEM

BACKGROUND OF THE INVENTION

1. Field of the Invention

The present invention relates to packet switching communication and ATM switching communication, and particularly to a routing control system.

2. Description of the Related Art

In connection-oriented communication as represented by ATM (Asynchronous Transfer Mode), one connection is established in one manner at the time of setting up a call and no change is allowed during a call. The application program communicates to the base (communication partner) using this ATM connection. Here, as one means of altering a route in response to congestive state in the network, one routing control method has been proposed by which a plurality of connections from source to destination are set up independently and the connections employed are altered for every information unit (message). The selection of connections at this time is executed only at the transmission node which is the information source. Devices such as terminals, information transfer servers, and routers that become information sources and transmit information are here-inbelow referred to as "transmission terminals."

In a case in which a transmission terminal transmits an information group made up of a plurality of information units from source to destination by a plurality of routes using a plurality of connections, one connection is used for each information unit transmitted. The plurality of connections that are set up for transmitting from source to destination by a plurality of routes are called the same connection group.

At this time, the ID of the VC (virtual channel) (hereinbelow referred to as "VCI"), or the ID of the VP (virtual path) (hereinbelow referred to as "VPI"), which are the identifiers of each connection, is required at each link (segment) between connection nodes.

FIG. 1 shows a routing table for a routing system of the prior art. In the routing table shown in FIG. 1, the input-side VCI are mapped to the output-side VCI. In other words, this table is a correspondence table such that VCI or VPI which are the ID of input packets (hereinbelow referred to simply as "input-side VCI"), are rewritten as the VCI or VPI which are the ID of output packets (hereinbelow referred to simply as "output-side VCI"). This means that, for example, a packet for which input side VCI=100 is rewritten as output side VCI=200 and outputted from the switch. In FIG. 1, one input-side VCI is mapped to one output-side VCI.

The first problem of the above-described prior art is the occurrence of a reduction in network throughput and communication quality degradation including delays and cell loss.

The cause of this problem is that, in general, when a network is very large, transmission nodes cannot accurately detect congestive states in the network, due to propagation delay and other factors, so that dynamic selection of optimum routes for good routing efficiency cannot be expected.

A second problem of the prior art is that the VCI and VPI required at each link (segment) between connection nodes are consumed in large volumes due to the plurality of connections used.

The reason for this is that only a limited number of these VCI and VPI are prepared, and, due to the concern that VCI and VPI will be exhausted because of the plurality of VCI and VPI consumed when using a plurality of connections, VCI and VPI must be conserved to ensure effective use of the network.

SUMMARY OF THE INVENTION

In view of these problems of the prior art, the object of the present invention is to provide a routing system that can bring about an improvement of throughput of a network as well as an improvement of communication quality, and moreover, that enables conservation of connection identifiers.

The routing system of the present invention is a routing control system that, for each call, sets up a plurality of connections in advance of transmission of information, selects one connection from this plurality of connections for each unit of transmission information, and then transmits the units of transmission information. The plurality of connections are not changed for sections in which the routes to be taken are different but are consolidated into one connection for sections in which the routes to be taken are the same; and a connecting device provided at the node, which are set up for a plurality of connections to either or to both the input and output sides, discretionary makes either a first connection, which is either the plurality of connections or one consolidated connection, to the input side, or a second connection, which is either the plurality of connections or one consolidated connection, to the output side.

According to the routing system of the present invention as described hereinabove, the connecting device changes connecting relationship between the first connection and the second connection for every unit of the transmission information in accordance with information held by the node indicating either or both the congestive state and the load conditions of a network.

According to the above-described routing system of the present invention, the connecting device can cause connecting relationship between the first connection and the second connection to change in accordance with the connecting information, held by each individual packet of the units of transmission information.

According to the above-described routing system of the present invention, a transmission terminal, which is the source of transmitted information, determines the routing and writes routing information into each individual packet for each transmission information unit; and the connecting device is capable of performing routing using the routing information designated by the transmission terminal.

According to the above-described routing system of the present invention, the method of consolidating routing information at the time of setting up connections is such that, after setting up each connection without consolidating connections, a plurality of connections at each node having a same destination can be consolidated as one connection, and the identifiers of the consequently unused connections can be saved to unused connection identifiers.

According to the above-described routing system of the present invention, a routing procedure at the time of setting up connections is such that, in setting up a plurality of connections at individual node, when there is the second connection set up for a destination which is the same as that of the first connection already set up at the node, the connection identifier of the first connection is mapped to the second connection and each plurality of connections is set up as one consolidated connection.

(1) The plurality of connections existing in parallel in the prior art are concentrated to one connection, and information is communicated using the one concentrated connection. As a result, a single connection identifier is sufficient for a plurality of connections, and the number of connection identifiers used on the entire network can be reduced. In other words, a multiplicity of routes can be switched by the nodes of a network using only a small number of connection identifiers, and load dispersion can be effectively carried out by routing.

For example, although the prior-art system required 100 VCI in a case in which 100 connections of the same connection group use the same link, just one VCI is sufficient for the present invention, thereby allowing a great reduction in the use of VCI.

In addition, rebranching of connection to a plurality of routes from a concentrated connection can be realized while the transmission terminal manages routes.

(2) Instead of the transmission terminal determining the route by which information is to be sent at the time of transmission as in the prior art, when a packet arrives at a node which decides the routing, the node uses the information it has indicating the load state and congestive state of the network together with the information contained in the packet determined by the repeater nodes, and can by using the most recent information control the routing in accordance with the state of the network. In other words, when nodes decide the routing, links having low use can be selected and congested connections avoided, thereby improving network throughput and communications quality.

For example, for a case in which the one-way propagation delay between a sending side and receiving side is 100 msec, and in which intermediate nodes exist for routes distribution, a delay of at least 100 msec is necessary for the sending side to be alerted of congestion occurring in the vicinity of the receiving side. However, for congestion occurring at intermediate nodes, the sending side can be alerted after a delay of only 50 msec, so that congestion can be dealt with effectively 50 msec sooner.

(3) By providing a procedure for identifying a plurality of connections on the same connection group, a table can be produced for concentrating the plurality of connections.

Using more recent network information allows information to be sent by the optimum route, brings about an improvement in network throughput, an improvement in communication quality, and moreover, conservation of connection identifiers.

The above and other objects, features, and advantages of the present invention will become apparent from the following description based on the accompanying drawings which illustrate examples of preferred embodiments of the present invention.

BRIEF DESCRIPTION OF THE DRAWINGS

FIG. 1 shows a routing table in a routing system of the prior art.

FIG. 3 shows a routing table in the first embodiment of the present invention.

FIG. 5 shows a routing table in the second embodiment of the present invention.

FIG. 6 shows a routing table in the second embodiment of the present invention.

FIG. 7 is a conceptual view of the procedures in the second embodiment of the present invention.

DETAILED DESCRIPTION OF THE PREFERRED EMBODIMENTS

Embodiments of the present invention will next be explained with reference to the accompanying figures.

Figure 2:
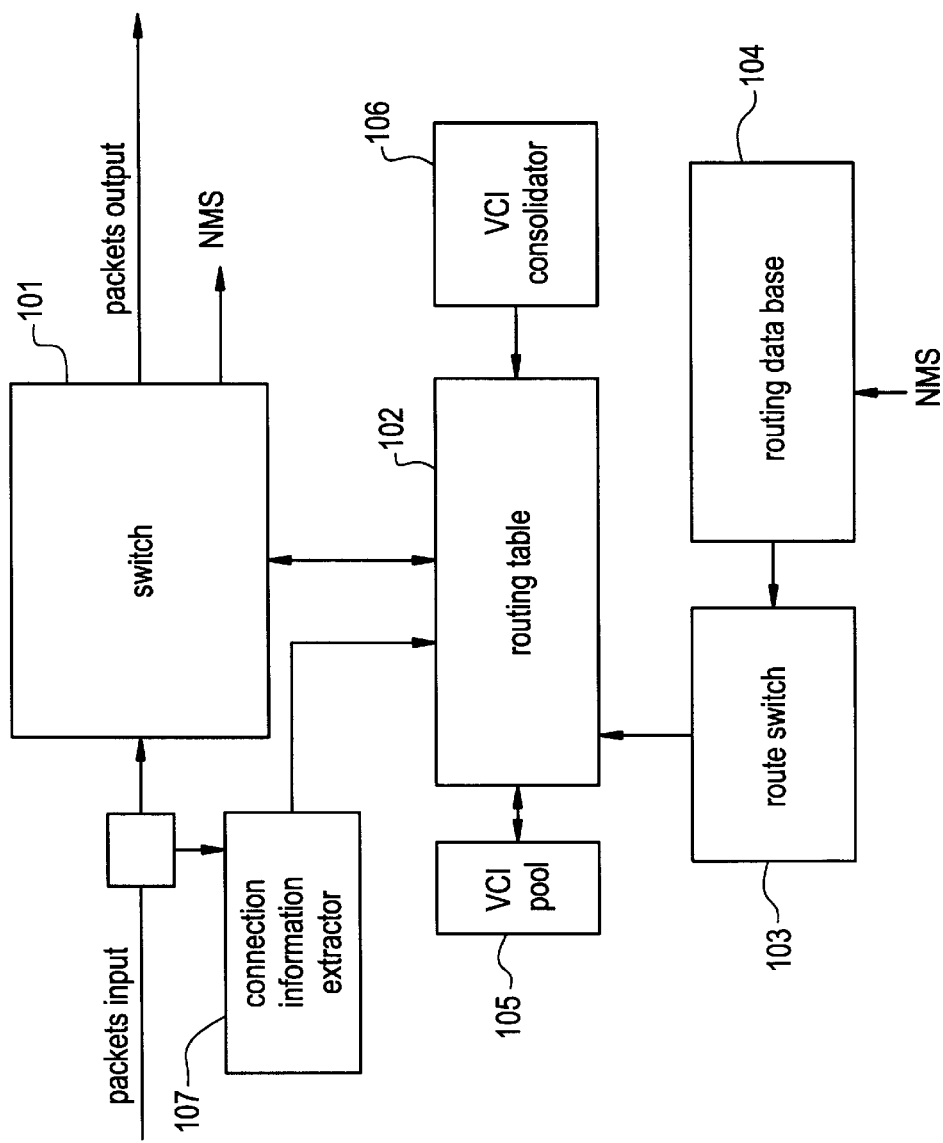
FIG. 2 shows the structure of a routing device in which the routing system of the present invention is applied.

FIG. 2 shows the structure of a routing device in which the routing system of the present invention is applied.

In the routing system according to the present invention, packets and ATM cells (hereinbelow referred to as simply "packets") are distributed between routes using a routing device (hereinbelow referred to as simply "node") including a switch as shown in FIG. 2, a cross-connector, and other components.

The node shown in FIG. 2 includes switch 101, routing table 102, route switch 103, routing data base 104, VCI (Virtual Channel Identifier) pool 105, VCI consolidator 106, and connecting information extractor 107.

In FIG. 2, when packets belonging to a connection already set up are inputted, the inputted packets are copied to connecting information extractor 107 where header information is extracted, and then, the packets are switched at switch 101. The header information extracted at connecting information extractor 107 is inputted to routing table 102, and the switch destinations of inputted packets are communicated to switch 101 based on the header information.

In addition, at the time of setting up connections, routing table 102 uses unused VCI numbers stored in VCI pool 105 at connections having set-up requests, and these VCI numbers are set to an "in use" state. When a connection is cut, the VCI numbers used at the connection that is cut are set to an "unused" state in VCI pool 105.

In working the present invention, the connection set-up procedure of the ATM requires no special procedures other than those of the prior art.

The present invention is distinguished by the mapping methods of the input cell ID and output cell ID in the routing table, and therefore, when setting up connections, any prior-art connection set-up procedure may be employed that stipulates a one-to-one mapping of input cell ID (input side VCI) and output cell ID (output-side VCI) in the routing table. UNI Spec. 3.1 as stipulated by The ATM Forum is one example of such a connection set-up procedure. In this case, connections are set up one by one in succession when setting up a plurality of connections from source to destination. However, a set-up procedure that requires that the plurality of connections be set up simultaneously is also possible. To simplify the explanation in each of the embodiments of the present invention, the setting of routing tables at each node is carried out for each connection set-up request in the order of arrival.

First Embodiment

The first embodiment of the present invention relates to a routing table.

FIG. 3 shows a routing table in the first embodiment of the present invention, and shows routing table 102 of the node shown in FIG. 2.

In the prior-art routing table shown in FIG. 1, one input-side VCI inputted to switch 101 shown in FIG. 2 is mapped to one output-side VCI. The routing table of the first embodiment shown in FIG. 3, however, is constructed such that a plurality of input-side VCI are mapped to a single output-side VCI. In other words, input-side VCI=100, 101, 102 are mapped to output-side VCI=200, and input-side VCI=103, 104, 105 are mapped to output-side VCI=201.

Figure 4:
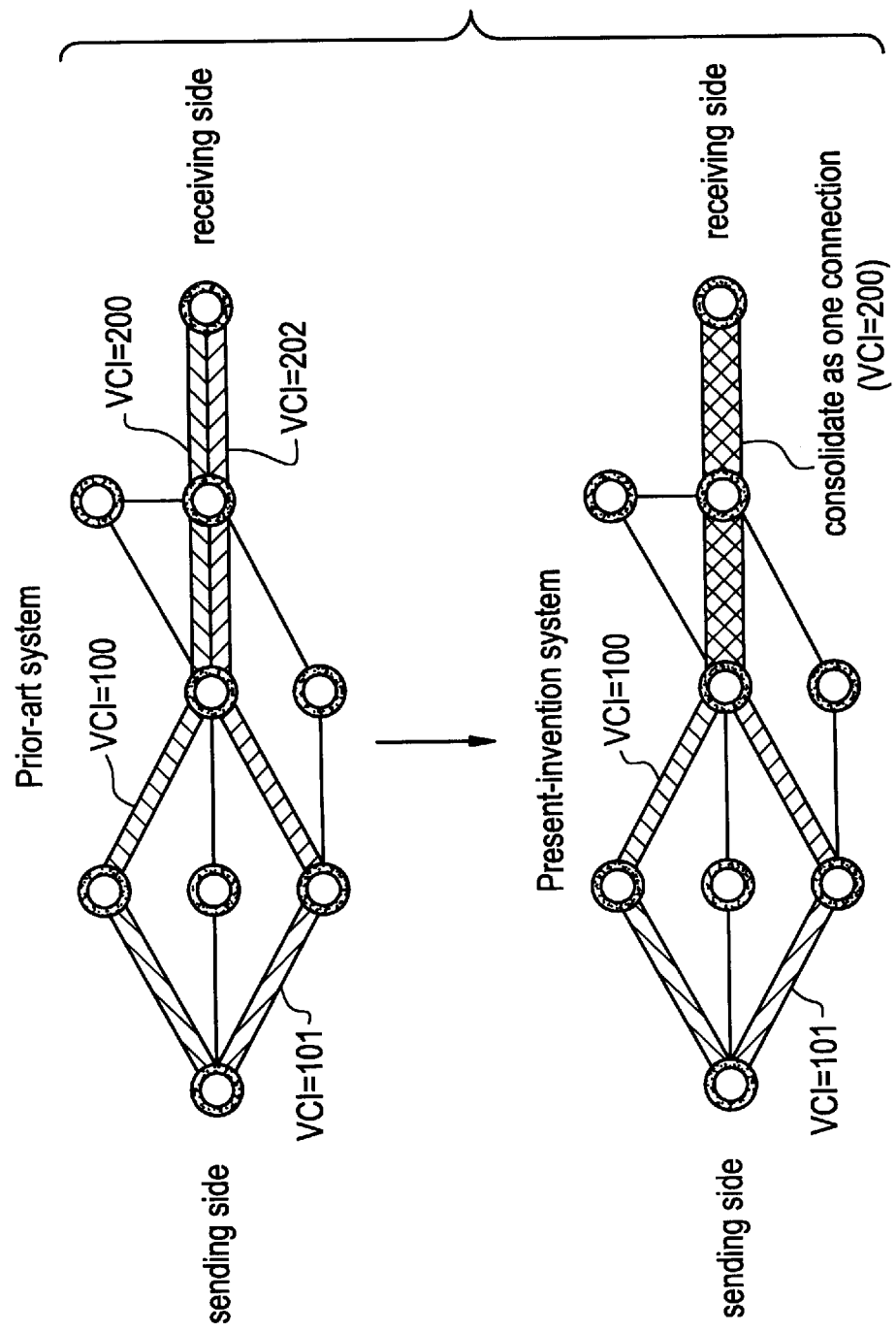
FIG. 4 is a conceptual view of the procedure in the first embodiment of the present invention.

FIG. 4 shows a conceptual view of the procedure of the first embodiment of the present invention, and presents a comparison of the results of setting up connections using the routing table shown in FIG. 3 and the results obtained using the routing table shown in FIG. 1.

Second Embodiment

In the same way as the first embodiment, the second embodiment of the present invention relates to a routing table and illustrates a case in which routes are switched based on an activity indicator.

FIG. 5 and FIG. 6 show a routing table for the second embodiment of the present invention and a routing table 102 of the node shown in FIG. 2.

FIG. 5 shows the routing table for a node which used connection A and connection B of the same connection group. In FIG. 5, input-side VCI=100 is mapped to output-side VCI=200, 201, 202 for connection A, and input-side VCI=101 is mapped to output-side VCI=203, 204, 205 for connection B. At this time, mapping of input-side and output-side VCI in the routing table shown in FIG. 5 is performed as follows. For connection A, any of the values VCI=200, 201, 202 can be taken as output-side VCI for input-side VCI=100. The value that is taken is determined by the ON or OFF state (corresponding to "1" and "0," respectively, in FIG. 5) of an activity indicator (hereinbelow referred to as "AI"), which is a symbol attached to each of output-side VCI=200, 201, 202 of connection A. Regarding the AI of this connection A, an ON state of only one AI of the output-side VCI indicates that this output-side VCI is to be used, and OFF states of all of the AI of the remaining output-side VCI indicate that these output-side VCI are not to be used. In connection B as well, each output-side VCI for use by connection B has an AI, and the operation is equivalent to that of connection A. FIG. 5 shows a situation in which the input-side VCI of connection A is mapped to output-side VCI=200, and the input-side VCI of connection B is mapped to output-side VCI=204. The switching of ON/OFF states of these AI is performed by route switch 103 shown in FIG. 2.

FIG. 6 shows a case in which, after consolidating the routes of a plurality of connections using the procedure described in the first embodiment, these routes are again branched using the procedure of the second embodiment. Connection A in FIG. 6 is assigned input-side VCI=100 or 101. At this time, input-side VCI is the output-side VCI in the routing table described in the first embodiment, which is the output of the node of the preceding section. The value that is taken in input-side VCI is determined by the procedure described in the first embodiment in the routing table of the node of the preceding section. For connection A, the input-side VCI are mapped output-side VCI=200, 201, 202 regardless of the value of the input-side VCI. In other words, any of the values output-side VCI=200, 201, 202 can be taken whether input-side VCI=100 or input-side VCI=101. The same as the case shown in FIG. 5, the value taken is determined by the ON/OFF state (corresponding to "1" and "0", respectively, in FIG. 6) of the AI attached to each of output-side VCI=200, 201, 202 of connection A. Regarding these AI, in output-side VCI=200~202, the ON state of only one AI of the output-side VCI for each input-side VCI indicates that this output-side VCI is to be used, and OFF states in all AI of the remaining output-side VCI indicate that these output-side VCI are not to be used. FIG. 6 shows the situation in which input-side VCI=100 is mapped to output-side VCI=201, and input-side VCI=101 is mapped to output-side VCI=200.

FIG. 7 is a conceptual view of the procedure in the second embodiment of the present invention. FIG. 7(A) presents a comparison of the results of setting up connections using the routing table shown in FIG. 5 and the results of setting up connections using the routing table shown in FIG. 1. FIG. 7(B) shows a comparison of the results of setting up connections using the routing table shown in FIG. 6 and the results of setting up connections using the routing table shown in FIG. 1.

Third Embodiment

The third embodiment of the present invention shows a case in which AI of the routing table described in the second embodiment is set up indirectly according to congestive information of a network managed by a routing data base.

Congestive information of a network described in the second embodiment can conceivably include such items as load, vacant bands, degree of congestion, cell loss rate, and cell delay times. In addition to these items, an index indicating the load state of the network can also be used. Routes are selected based on these indices according to a procedure that is determined beforehand at route switch 103. For example, a selection algorithm may be used by which routes having the lowest rate of use are selected.

Route switch 103 selects the optimum route at each connection using any of the information contained within the information on congestion of the network that is extracted from routing data base 104, which manages information indicating the congestive state of the network as the optimum routing information. Routing data base 104 may be any device that reflects the load state of the network. As one example, an ABR control procedure described in Draft specification ATM Forum 94-0471R8 of The ATM Forum (March 1995) discloses an ER rate within an RM cell designated for each connection, and this ER rate may be used as data indicating the congestive state of a route by which the RM cell was sent.

Fourth Embodiment

The fourth embodiment of the present invention presents a case in which the AI of the routing table described in the second embodiment are set up using network congestive information held by the packets themselves.

In the fourth embodiment, route switch 103 extracts some of the congestive information not from routing data base 104 described in the second embodiment, but from arriving packets, and based on this information, selects the optimum route for each connection. After determining routes, this determined routing is maintained as long as no information for route determination (route updating) is recorded in newly received packets. This congestive information may include such factors as load, vacant bands, degree of congestion, cell loss rate, and cell delay times. In addition, indices indicating load conditions in the network may also be used. These indices may be received from, for example, a network management system (NMS) by way of routing data base 104. The route selection based on these indices is carried out according to a predetermined procedure at route switch 103. For example, an algorithm may be used that results in selection of routes in which no congestion occurs. Alternatively, the transmission terminal may designate which route is to selected based on these indices and record this information in packets to execute selection. Packets would be required to carry information indicating network congestive state or load conditions, and one possible method of conveying this information is, for example, to confer ER information to RM cells as described in Draft Specification ATM Forum 95-0013R8 of The ATM Forum (October 1995).

Fifth Embodiment

The fifth embodiment of the present invention presents a case in which the AI of the routing table described in the second embodiment are set up using network connecting information held by the packets themselves. In the fifth embodiment, route switch 103 extracts information not from routing data base 104 described in the second embodiment, but from arriving packets. In addition, the extracted information is not congestive information described in the fourth embodiment, but connecting information. After the arrival of a packet, route switch 103 routes subsequent packets based on the extracted connecting information. This connecting information is designated at the time of transmitting information by the transmission terminal that is the source of transmitted information and recorded in the packets. Connecting information extractor 107 extracts this connecting information from arriving packets and forwards it to routing table 102.

Sixth Embodiment

The sixth embodiment of the present invention relates to the set-up procedure of the routing table described in the first embodiment.

According to the sixth embodiment, when setting up a connection, VCI consolidator 106 shown in FIG. 2 searches all connecting data of the routing table after obtaining input-side VCI and output-side VCI, and when a connection (connection B) is discovered in the same connection group as that set up for the next target node of the connection (connection A), changes the output-side VCI of connection A to the output-side VCI of connection B. In addition, it returns the output-side VCI number of connection A to VCI pool 105, which manages unused output-side VCI numbers, and sets it to an unused state.

For example, when connection B input-side VCI=100 is mapped to output-side VCI=200, input-side VCI=101 is mapped to output-side VCI=202 immediately after setting up connection A as shown in FIG. 1. However, when VCI consolidator 106 operates immediately after setting up connection A, connection A input-side VCI=101 is mapped to output-side VCI=200. This result is the same as the routing table shown in FIG. 3.

Seventh Embodiment

The seventh embodiment of the present invention relates to the set-up procedure of the routing table described in the first embodiment.

In the seventh embodiment, when setting up a connection, VCI consolidator 106 shown in FIG. 2 searches all connecting data of the routing table before obtaining input-side VCI and output-side VCI. Then, when a connection (connection B) is discovered in the same connection group as that set up for the next target node of the connection (connection A), VCI consolidator 106 makes the output-side VCI of connection A the same as the output-side VCI of connection B.

For example, if connection A has already been set up and its input-side VCI=100 is mapped to output-side VCI=200, output-side VCI=200 is mapped to input-side VCI=101 for connection B of the same connection group. Moreover, output-side VCI=200 is mapped to input-side VCI=102 for connection C of the same connection group. The result is the same as the routing table shown in FIG. 3.

It is to be understood, however, that although the characteristics and advantages of the present invention have been set forth in the foregoing description, the disclosure is illustrative only, and changes may be made in the arrangement of the parts within the scope of the appended claims.

What is claimed is:

1. A routing system for establishing a plurality of connections having Virtual Channel Identifiers (VCIs) or Virtual Path Identifiers (VPIs) for each call between a transmission terminal and a reception terminal through a plurality of nodes, prior to transmission of information from said transmission terminal to said reception terminal, and for selecting one connection from among said plurality of connections for each unit of information;

said routing system comprising:
    means provided at at least one of said nodes, for a section where all of said connections take different routes, for establishing said connections without changing the routes, and for a section where at least two connections take the same route, for combining said connections that take the same route into a combined connection having one VCI or one VPI; and
    means provided at at least one of said nodes, for making arbitrary connections between a first connection at an input side of said at least one of said nodes which is a combined connection or is selected from a plurality of connections, and a second connection at an output side of said at least one of said nodes which is a combined connection or is selected from a plurality of connections.

2. A routing system for establishing a plurality of connections for each call between a transmission terminal and a reception terminal through a plurality of nodes, prior to transmission of information from said transmission terminal to said reception terminal, and for selecting one connection from among said plurality of connections for each unit of information;

said routing system comprising:
    means provided at said node, for a section where all of said connections take different routes, for establishing said connections without changing the routes, and for a section where at least two connections take the same route, for combining said connections that take the same route into one connection; and
    means provided at said node, for making arbitrary connections between a first connection at an input side of said node which is a combined connection or is selected from a plurality of connections, and a second connection at an output side of said node which is a combined connection or is selected from a plurality of connections
    wherein, said means for making arbitrary connections includes means for changing connecting relationship between said first connection and said second connection for each said unit of information in accordance with information held by said node indicative of at least one of a congestion state and a load condition of a network including said transmission terminal, said reception tenninal, and said plurality of nodes.

3. A routing system according to claim 2 wherein, said means for making arbitrary connections includes means for changing connecting relationship between said first connection and said second connection in accordance with said information held by each packet of said units of information.

4. A routing system according to claim 2 wherein, said transmission terminal includes means for determining routes, and writing said determined routes into each individual packet for each of said information unit; and
    said means for making arbitrary connections includes means for performing routing using the route information specified by said transmission terminal.

5. A routing system for establishing a plurality of connections for each call between a transmission terminal and a reception terminal through a plurality of nodes, prior to transmission of information from said transmission terminal to said reception terminal, and for selecting one connection from among said plurality of connections for each unit of information;

said routing system comprising:
  means provided at said node, for a section where all of said connections take different routes, for establishing said connections without changing the routes, and for a section where at lest two connections take the same route, for combing said connections that take the same route into one connection; and
  means provided at said node, for making arbitrary connections between a first connection at an input side of said node which is a combined connection or is selected from a plurality of connections, and a second connection at an output side of said node which is a combined connection or is selected from a plurality of connections
  wherein, said means for establishing connection includes means for establishing said plurality of connections, and thereafter, for a section where all of the connections take the same route, for combining said connections into one connection, and for identifying the unused connections as a result of said combining as unused connection identifiers.

6. A routing system for establishing a plurality of connections for each call between a transmission terminal and a reception terminal through a plurality of nodes, prior to transmission of information from said transmission terminal to said reception terminal, and for selecting one connection from among said plurality of connections for each unit of information; said routing system comprising:
  means provided at said node, for a section where all of said connections take different routes, for establishing said connections without changing the routes, and for a section where at lest two connections take the same route, for combing said connections that take the same route into one connection; and
  means provided at said node, for making arbitrary connections between a first connection at an input side of said node which is a combined connection or is selected from a plurality of connections, and a second connection at an output side of said node which is a combined connection or is selected from a plurality of connections
wherein, said means for establishing connection includes means for mapping the connection identifier of said first connection and said second connection wherein said second connection is already set up for a destination which is same as that of said first connection and for setting up each plurality of connections as a combined connection.

7. A routing system for establishing a plurality of connections having Virtual Channel Identifiers (VCIs) or Virtual Path Identifiers (VPIs) for each call between a transmission terminals and a reception terminal through a plurality of nodes, prior to transmission of information from said transmission terminal to said reception terminal, and for selecting one connection from among said plurality of connections for each unit of information;

said routing system comprising:
  a node, said node having a first section where all said connections take different routes, and for establishing said connections without changing the routes, and a second section where at least two connections that take the same route and for combining said connections that take the same route into a combine connection having one VCI or one VPU; and
  a connecting device for making arbitrary connections between a first connection at an input side of at least one of said nodes which is a combined connection or is selected from a plurality of connections, and a second connection at an output side of at least one of said nodes which is a combined connection or is selected from a plurality of connections.

8. A routing system for establishing a plurality of connections for each call between a transmission terminal and a reception terminal through a plurality of nodes, prior to transmission of information from said transmission terminal to said reception terminal, and for selecting one connection from among said plurality of connections for each unit of information;

said routing system comprising:
  a node, said node having a first section where all said connections take different routes, and for establishing said connections without changing the routes, and a second section where at least two connections that take the same route and for combining said connections that take the same route into one connection; and
  a connecting device, provided at said node, for making arbitrary connections between a first connection at an input side of said nodes which is a combined connection or is selected from a plurality of connections, and a second connection at an output side of said node which is a combined connection or is selected from a plurality of connections,
  wherein said connecting device for making arbitrary decisions includes a changing connection unit for changing connecting relationship between said first connection and said second connection for each said unit of information in accordance with information held by said node indicative of at least one of a congestion state and a load condition of a network including said transmission terminal, said reception terminal, and said plurality of nodes.

9. A routing system according to claim 8 wherein, said connecting device for making arbitrary decisions includes a changing connection unit for changing connecting relationship between said first connection and said second connection for each said unit of information in accordance with information held by said node indicative of at least one of a congestion state and a load condition of a network including said transmission terminal, said reception terminal, and said plurality of nodes.

10. A routing system according to claim 8 wherein, said transmission terminal includes a route determining unit for determining routes and writing said determined routes into each individual packet for each of said information unit; and said connecting device includes a routing unit for performing routing using the route information specified by said transmission terminal.

11. A routing system for establishing a plurality of connections for each call between a transmission terminal and a reception turminal through a plurality of nodes, prior to transmission of information from said transmission terminal to said reception terminal, and for selecting one connection from among said plurality of connections for each unit of information;

said routing system comprising:
  a node, said node having a first section where all said connections take different routes, and for establishing said connections without changing the routes, and a second section where at least two connections that take the same route and for combining said connections that take the same route into one connection; and a connecting device, provided at said node, for making arbitrary connections between a first connection at an input side of said nodes which is a combined connection or is selected from a plurality of connections, and a second connection at an output side of said node which is a combined connection or is selected from a plurality of connections, wherein said connection device for establishing said connections includes a connection unit for establishing said plurality of connections, and thereafter, for said second section where all of the connections taking the same route are combined into one connection and said connection device identifies the unused connections as a result of said combining as unused connection identifiers.

12. A routing system for establishing a plurality of connections for each call between a transmission terminal and a reception terminal through a plurality of nodes, prior to transmission of information from said transmission terminal to said reception terminal, and for selecting one connection from among said plurality of connections for each unit of information;

said routing system comprising:

a node, said node having a first section where all said connections take different routes, and for establishing said connections without changing the routes, and a second section where at least two connections that take the same route and for combining said connections that take the same route into one connection; and a connecting device, provided at said node, for making arbitrary connections between a first connection at an input side of said nodes which is a combined connection or is selected from a plurality of connections, and a second connection at an output side of said node which is a combined connection or is selected from a plurality of connections, wherein said connection device includes a mapping unit for mapping the connection identifiers of said first connection and said second connection wherein said second connection is already set up for a destination which is the same as that of said first connection and for setting up each plurality of connections as a combined connection.

* * * * *